July 19, 1966   G. F. DAVIES   3,261,558
ROCKET FLUID DISCHARGE NOZZLE
Filed Jan. 23, 1962
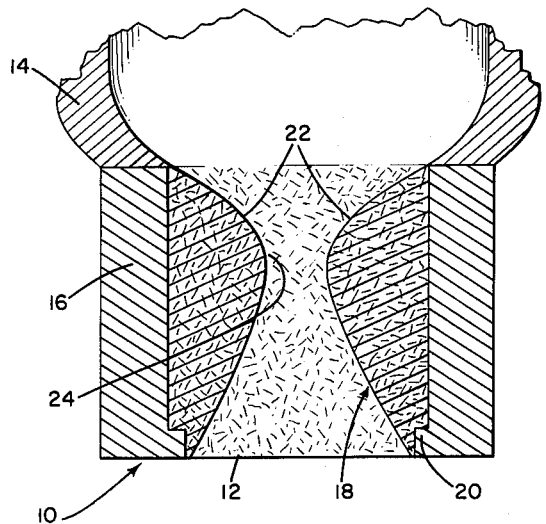
FIG.1
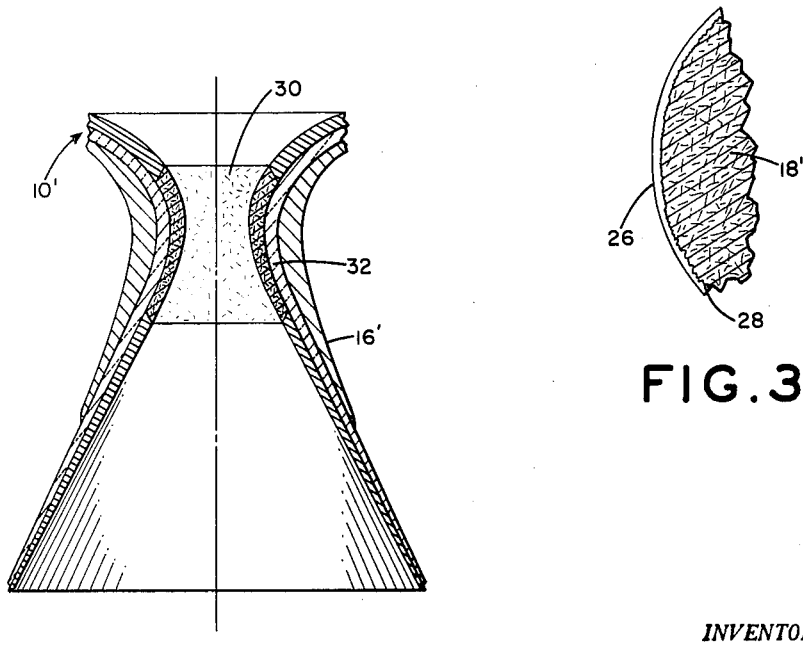
FIG.2
FIG.3
INVENTOR.
GAIL F. DAVIES
BY
ATTORNEY United States Patent Office 3,261,558
Patented July 19, 1966

3,261,558
ROCKET FLUID DISCHARGE NOZZLE
Gail F. Davies, Mentor Township, Ohio, assignor to Clevite Corporation, a corporation of Ohio
Filed Jan. 23, 1962, Ser. No. 168,278
4 Claims. (Cl. 239—601)

This invention relates to a rocket fluid discharge nozzle and more particularly has reference to an improved nozzle lining for the direction of a jet of hot gaseous fluid.

In the prior art it has been common to employ refractory ceramics or metals having a high melting point or a porous structure for absorbing heat by external cooling or heat-sink. These materials have been characterized by their inability to accommodate to the abnormally high heat fluxes of the rocket engine with a consequent development of excessive internal stresses and ensuing failure due to cracking.

For instance, in materials which are normally notch sensitive, surface irregularities of microscopic size, or internal porosity, have been sufficient to produce a notch. Stress concentration or such structural weaknesses has caused cracking problems.

Tungsten which is a body centered cubic element is such a notch sensitive material having a melting point second only to hafnium and zirconium, carbide. Although the tungsten is less brittle than cermets, its application and deployment in connection with rocket nozzles has been held back by its poor resistance to thermal stress cracking.

It is the primary object of this invention to provide a fluid nozzle in which the critical surfaces thereof are composed of material having a very low notch sensitivity, are resistant to erosion, and are capable of withstanding high temperatures.

It is another object of this invention to provide a rocket fluid discharge nozzle which is uniquely adapted to withstand severe thermal stress applications without failure due to cracking.

For a better understanding of the present invention, together with other and further objects thereof, reference is had to the following description taken in connection with the accompanying drawings, and its scope will be pointed out in the appended claims.

In the drawing:
FIGURE 1 is a longitudinal sectional view through one form of rocket fluid discharge nozzle constructed according to the invention;
FIGURE 2 is a longitudinal sectional view through a somewhat modified form of nozzle; and
FIGURE 3 is a partly fragmentary, longitudinal sectional view of a nozzle as shown in FIGURE 1, except as noted.

One aspect of the invention resides in the provision of a rocket fluid discharge nozzle which comprises a protective outer casing, and a composite metal body of high temperature and high thermal shock-resistant material, the body is housed within the casing and has an axial bore of convergent-divergent configuration and includes a restricted cross-sectional throat area, and means for connecting the casing to the body. A fibered tungsten body constitutes at least part of the composite metal body arranged proximate to the area of maximum heat flux within the bore.

Referring now to FIGURE 1, there is shown a nozzle block 10 of generally cylindrical shape provided with a substantially axial bore 12 of symmetrical configuration. The nozzle block 10 is shown, for purposes of illustration, as being connected to part of a rocket body 14. The axial bore 12 being in suitable alignment with the fluid passageway of the vehicle engine, not shown.

More particularly, the nozzle block 10 of this invention is comprised of a support and retainer member 16 hereinafter referred to as casing. The casing is made of suitable steel, graphite, or refractory material which is capable to perform under temperatures sustained in operation.

Under certain conditions it may be desirable to contain the housing within additional support structures (not shown) for incorporation of vectoring devices and the like.

Disposed within the casing 16 is a composite metal body 18 of high temperature and thermal shock resistant materials. The casing 16 is provided with a mechanical projection 20 to support and contain the composite metal body 18. The interface between the body 18 and the casing 16 may be filled with a cement (not shown) or the body 18 may be press fitted into the support and retainer casing.

In operation, the nozzle block 10 and specifically the composite metal body is required to perform under conditions of temperature initiating at or below room temperature, with a rise to temperatures approaching the melting point of tungsten in a few micro-seconds. Generally, the area 22 upstream of the throat area is where shear movement of the gas stream with respect to the bore axis is at a maximum and thus being the point subjected to maximum heat flux. Similarly, the throat area 24, that is the cross-section of minimum diameter, is the point of maximum gas velocity and is consequently subjected to high heat flux, high temperature and severe erosion conditions.

To satisfy the severe requirements the composite metal body is composed, either completely but at least partly, of fibered tungsten material. In the case where the body 18 is composed only partly of fibered tungsten material, the latter material is disposed proximate to the areas subjected to maximum heat flux as above defined. The remainder of the composite metal body 18 is then also made of fibered tungsten or, alternatively, of a high heat-sink material or material having insulating qualities.

Preferably, the fibered tungsten body includes a matrix of powdered tungsten with molybdenum fibers running through the matrix and being bonded thereto. While the use of molybdenum fibers have been most successful it is, nevertheless, possible to use alloys of molybdenum or other suitable fiber materials provided they have the following relationship with the matrix:

(1) The fiber should possess ductility and strength up to the brittle to ductile transition point of the matrix when the composite body is subjected to normal operating conditions.

(2) The chemical metallurgical relationship between the fiber and the tungsten matrix must be such that a condition of solubility of each within the other exists to guarantee wetting, yet a minimum of alloying and compound formation must take place.

The composition of the following combination has been found to operate satisfactorily in connection with rocket nozzles. The fibered tungsten body has a density of 70 to 100 percent of its theoretical density. The theoretical density being determined by the actual composition limits of the molybdenum and tungsten used in the composite. The matrix or tungsten material constitutes 95 to 75 weight percent of the composite mixture, with the molybdenum fibers or wires constituting the reciprocable or 5 to 25 weight percent of the composite mixture.

In the incorporation of molybdenum fibers in the tungsten matrix the selection of a minimum diameter fiber is influenced by thermal process variables. In the processing of the composite the rate of solution of molybdenum in tungsten is the limiting factor so that the diameter of tungsten fiber selected must be such that at the end of thermal processing a discrete fiber structure remains. The following molybdenum fiber dimensions have been found to be suitable: 5 to 25 mil diameter, with the length ranging from the minimum range between 1/16 to 1/8 of an inch to a maximum range between 1/4 to 3/8 of an inch. Preferably, the fibers should be relatively straight fibers.

FIGURE 3 shows a support body 18', which in construction and material composition is similar to body 18 of FIGURE 1, except as noted. The area shown approaches (substantially) the area of maximum heat flux. In FIGURE 3 the fibered tungsten support body 18' is modified to the extent that the external surfaces of the bore 12, which are exposed to the hot gases, are overlaid with a 90 to 100 percent dense tungsten layer 26. Preferably, the thickness of the layer ranges from 0.005 inch to 0.070 inch.

It is to be noted that the bond interface 28 between body 18' and the layer 26 is irregular and denotes diffusion of the overlay into the body 18' producing a metallurgical bond of high integrity.

The overlay is required in many cases to improve the performance of the composite body. This composite body 18' is composed of a high melting point matrix material and a somewhat lower melting point fiber dispersant and occasionally in operation attains temperatures approaching the melting point of the dispersant, or if the dispersant is oxidizable, given certain adverse conditions the fibers may be oxidized. Therefore under oxidizing conditions, or conditions of severe erosion, it is desirable to provide as nearly a continuous tungsten face as possible while incorporating the thermal shock-resistant aspects into the support body. The need for a high integrity bond is to insure uniform transmission of thermal stresses to the support body 18'.

Referring now to FIGURE 2 there is shown a nozzle block 10' having a casing 16', substantially similar to casing 16, see FIGURE 1. A suitable insulator lining 32 covers the casing 16' and in turn this insulator liner 32 is covered by a metal lining insert 30 which is composed of fibered tungsten composite.

In accordance with the invention as aforedescribed, the fibered tungsten composite metal lining insert covers the surfaces normally exposed to maximum heat flux and specifically includes the restricted throat area.

The lining is composed of the same material as described in connection with the composite metal body 18. As a variant it is possible to provide the lining insert with an overlay of tungsten material in the same manner and of the same nature as above described.

While there have been described what are at present considered to be the preferred embodiments of this invention, it will be obvious to those skilled in the art that various changes and modifications may be made therein without departing from the invention, and it is, therefore, aimed in the appended claims to cover all such changes and modifications as fall within the true spirit and scope of the invention.

I claim as my invention:

1. A rocket fluid discharge nozzle comprising: a composite metal body having an axial bore of convergent-divergent configuration including a restricted cross sectional throat area and being composed of a matrix of powdered tungsten and fibers of a different metallic material uniformly distributed therethrough; and an overlay of tungsten material covering the external portions of the composite metal body within said bore and being metallurgically bonded thereto, the overlay having a density of 90 to 100 percent of theoretical density and a thickness ranging from 0.005 inch to 0.070 inch.

2. A rocket fluid discharge nozzle according to claim 1, wherein said fibers are discontinuous and composed of molybdenum.

3. A rocket fluid discharge nozzle according to claim 2, wherein said fibered tungsten body has a density of 70 to 100 percent of theoretical density, and said molybdenum fibers constitute 5 to 25 weight percent of the composite mixture and said matrix material constitutes 95 to 75 weight percent of the composite mixture.

4. A rocket fluid discharge nozzle comprising: a metal body having an axial bore of convergent-divergent configuration including a restricted cross sectional throat area; a metal lining insert in said bore covering at least those surfaces normally exposed to maximum heat-flux and specifically including said throat area, said lining being composed of a matrix of powdered tungsten and fibers of a different metallic material uniformly distributed therethrough; and an overlay of tungsten material covering the external portions of the lining and being metallurgically bonded thereto, the overlay having a density of 90 to 100 percent of theoretical density and a thickness ranging from 0.005 inch to 0.070 inch.

References Cited by the Examiner

UNITED STATES PATENTS

| | | | |
|---|---|---|---|
| 3,032,982 | 5/1962 | Gaubatz | 60—35.6 |
| 3,145,529 | 8/1964 | Maloof | 60—35.6 |

FOREIGN PATENTS 674,152   6/1952   Great Britain.

MARK NEWMAN, *Primary Examiner.*

SAMUEL FEINBERG, *Examiner.*